United States Patent
Yoshihara et al.

(10) Patent No.: US 6,938,501 B2
(45) Date of Patent: Sep. 6, 2005

(54) SEMICONDUCTOR DYNAMIC QUANTITY SENSOR

(75) Inventors: Shinji Yoshihara, Nagoya (JP); Inao Toyoda, Anjo (JP); Yasutoshi Suzuki, Okazaki (JP)

(73) Assignee: Denso Corporation, Kariya (JP)

( * ) Notice: Subject to any disclaimer, the term of this patent is extended or adjusted under 35 U.S.C. 154(b) by 29 days.

(21) Appl. No.: 10/625,896

(22) Filed: Jul. 24, 2003

(65) Prior Publication Data

US 2004/0166601 A1 Aug. 26, 2004

(30) Foreign Application Priority Data

Jul. 25, 2002 (JP) ........................................ 2002-216648

(51) Int. Cl.[7] ............................ G01L 1/22; H01L 29/84
(52) U.S. Cl. .................................. 73/862.628; 257/419
(58) Field of Search ..................... 73/862.68, 862.627, 73/862.628; 438/53; 257/415–420

(56) References Cited

U.S. PATENT DOCUMENTS 6,422,088 B1 * 7/2002 Oba et al. ..................... 73/754

2002/0100948 A1    8/2002 Yoshihara et al.

FOREIGN PATENT DOCUMENTS

JP    A-H10-170370    6/1998

* cited by examiner

*Primary Examiner*—Erik Kielin
(74) *Attorney, Agent, or Firm*—Posz Law Group, PLC (57) ABSTRACT

A semiconductor dynamic quantity sensor detects a dynamic force and a fault diagnosis through the use of a single bridge circuit. Sensor output terminals are connected to midpoints between gauge resistors to make a combination of the midpoints at which an equal electric potential is measured when no pressure is applied to a diaphragm of the sensor. Fault diagnostic output terminals are connected to wiring patterns in the same manner as the first output terminals. One of the sensor output terminals has three selectable terminals connected to different positions of the midpoint. One of the diagnostic output terminals also has three selectable terminals connected to different positions of the wiring patterns. Accordingly, an offset voltage of the sensor output and the fault diagnostic output can be adjusted appropriately when one of the selectable terminals are selected as appropriate.

10 Claims, 8 Drawing Sheets

SEMICONDUCTOR DYNAMIC QUANTITY SENSOR

REFERENCE TO RELATED APPLICATIONS

This application is based on Japanese Patent Application No. 2002-216648 filed on Jul. 25, 2002, the contents of which are incorporated herein by reference.

BACKGROUND OF THE INVENTION

1. Field of the Invention

The present invention relates to a semiconductor dynamic quantity sensor for detecting a dynamic force.

2. Description of Related Art

A semiconductor dynamic quantity sensor includes a semiconductor substrate and a bridge circuit. The semiconductor substrate has a diaphragm that changes its shape in accordance with an application of a dynamic force, such as a pressure and acceleration force. The bridge circuit has gauge resistors formed on the substrate. Resistances of the gauge resistors vary as the shape of the diaphragm 14 changes. The sensor produces a sensor output and a diagnostic output through the use of the bridge circuit for a fault diagnosis that is performed based on a comparison of the outputs.

In such a sensor, the outputs for the dynamic quantity measurement and for the fault diagnosis can be produced by a single bridge circuit. As a result, the sensor is reduced in size.

Figure 9:
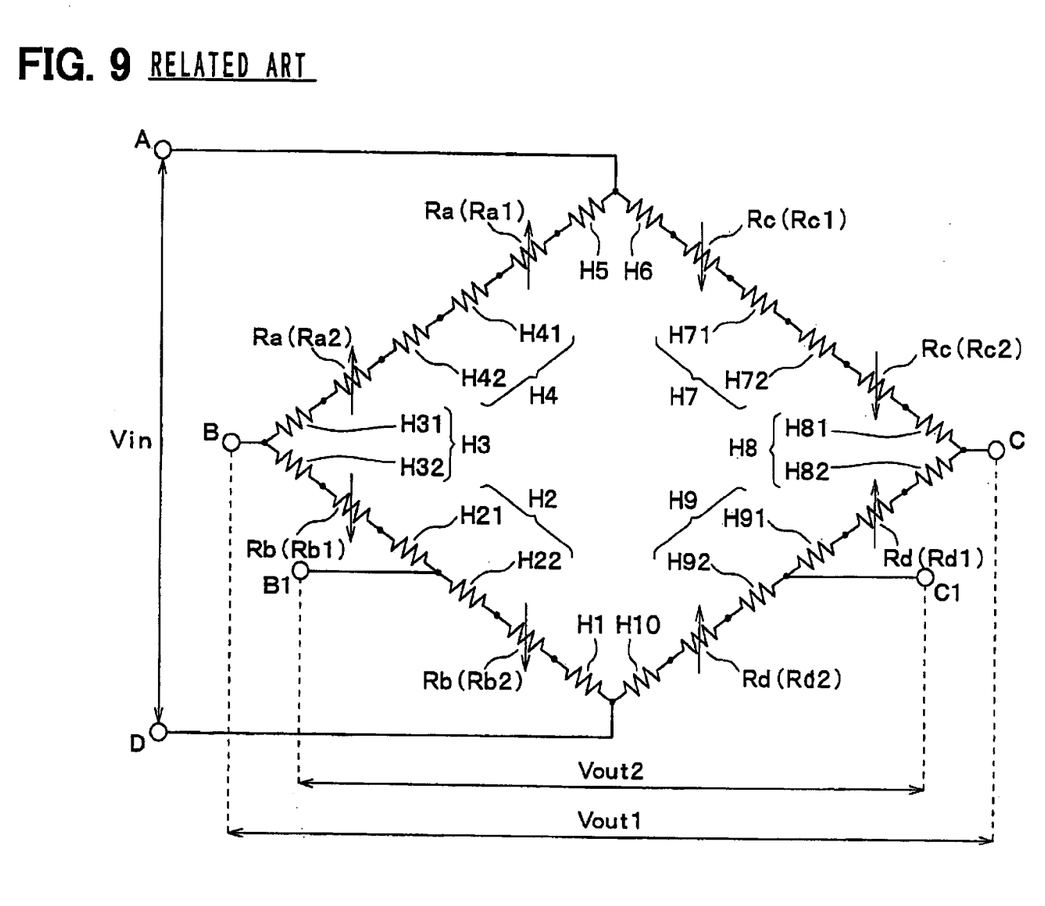
FIG. 9 is an equivalent circuit diagram according to a related art.

The applicant filed a related Japanese patent application No. JP-2001-221697. FIG. 9 shows an equivalent circuit of a bridge circuit described in the related art. The bridge circuit has a Wheatstone bridge circuit constructed of four gauge resistors Ra, Rb, Rc, and Rd that are connected in series to form a quadrangular closed circuit. Resistors of wiring patterns H1 to H10 between the gauge resistors are shown.

Terminals A, B, C, and D are electrically connected to respective junctions of the wiring patterns H1 and H10, H31 and H31, H5 and H6, and H81 and H82. The terminals A and D are used for inputting an input voltage (input signal) Vin. The terminals B and C are used for outputting a first differential voltage (output signal) Vout1. The input terminals A and D are electrically connected to a power supply (first electric potential) and the ground (second electric potential), respectively.

Each of the four gauge resistors Ra to Rd is equally divided into two divisional gauge resistors. For instance, the gauge resistor Ra, which is provided between the input terminal A and the output terminal B, is divided into the divisional gauge resistors Ra1 and Ra2. Other gauge resistors Rb to Rd are divided into two gauge resistors Rb1 and Rb2, Rc1 and Rc2, and Rd1 and Rd2, respectively in the same manner as the gauge resistor Ra.

The gauge resistor Ra has a first midpoint between the divisional gauge resistors Ra1 and Ra2. The gauge resistor Rb has a second midpoint between the divisional gauge resistors Rb1 and Rb2, and the second midpoint is electrically connected to a middle terminal B1. The gauge resistor Rc has a third midpoint between the divisional gauge resistors Rc1 and Rc2. The gauge resistor Rd has a fourth midpoint between the divisional gauge resistors Rd1 and Rd2, and the fourth midpoint is electrically connected to a middle terminal C1.

The middle terminals B1 and C1 make a combination of the midpoints at which an equal electric potential is measured when no pressure is applied to the bridge circuit. The combination of the middle terminals B1 and C1 is used as the output terminals for the diagnosis. A second potential difference Vout2 between the middle terminals B1 and C1 is used as the diagnostic output to detect a fault of the sensor.

When the diaphragm changes its shape by applying the dynamic force in condition that the input signal Vin is inputted into the bridge circuit, the four gauge resistors Ra to Rd lose a balance in electrically. The first differential voltage (output signal) Vout1 varies in response to the amount of the applied dynamic force. The first differential voltage Vout1 is supplied to an external circuit to detect intensity of the dynamic quantity.

The fault is detected by that the first differential voltage Vout1 is compared with the second differential voltage Vout2. The first differential voltage Vout1 is used as the sensor output. Since each divisional gauge resistors Ra1 to Rd2 has the same resistance, a first ratio between the divisional gauge resistors Rd1 and Rd2 is 1:1, and a second ratio between the divisional gauge resistors Rb1 and Rb2 is 1:1. Accordingly, in a normal condition, the second differential voltage Vout2 is always a half voltage of the first differential voltage Vout1.

However, in an unusual condition that an irregular stress is applied to the diaphragm or the divisional gauge resistors Ra1 to Rd2 are broken, the first ratio and the second ratio are deviated from 1:1. As a result, in the unusual condition, the second differential voltage Vout2 for the diagnosis is not a half voltage of the first differential voltage Vout1. That is, a relation between the differential voltages Vout1 and Vout2 in the unusual condition is different from the relation in the normal condition. This provides the judgment of the fault in the sensor.

Offset voltages exist in both the first differential voltage Vout1 and the second differential voltage Vout2 in the bridge circuit. The offset voltages, which are generated by the first and second differential voltages Vout1 and Vout2 when the dynamic force is not applied to the diaphragm, cause an error of detection. If resistors of the wiring patterns H1 to H10 that connect between the divisional gauge resistors Ra1 to Rd2 are zero or the identical in the bridge circuit, resistances of the bridge circuit are determined by a pattern of the circuit or a circuit layout. Further, if each of the resistances of the divisional gauge resistors is identical, the offset voltage does not exist in the sensor output and the diagnostic output.

However, in reality, resistances of the wiring patterns H1 to H10 exist in each of the divisional gauge resistors Ra1 to Rd2 and between the terminals A, B, C, D, B1, and B2. If the resistances of the wiring patterns H1 to H10 are identical with each other, the offset voltage is equal to zero. However, it is difficult to adjust the resistances of the wiring patterns to be equal to each other because of the pattern of the wiring patterns and the circuit layout.

In such a sensor, an external resistor is connected to the bridge circuit, and a resistance of the external resistor is adjusted by a trimming operation so that the offset voltage becomes a certain voltage. However, it is difficult to adjust the two offset voltages with respect to the sensor output and the diagnostic output by the connection of the external resistor.

Figure 10:
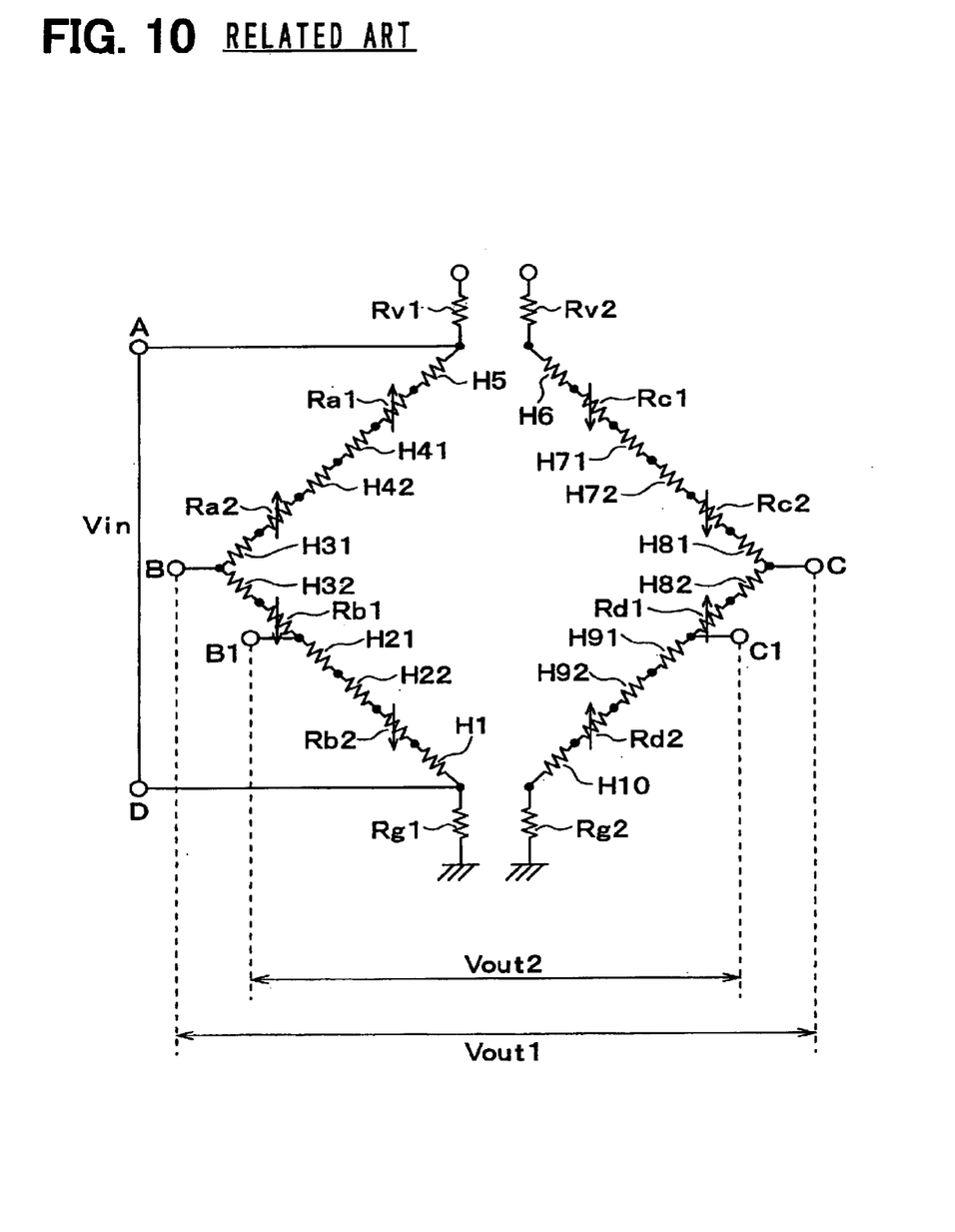
FIG. 10 is an equivalent circuit diagram along with external resistors according to the related art.

FIG. 10 shows an equivalent circuit of the bridge circuit shown in FIG. 9 along with the external resistors. Suppose that the offset voltage of the second differential voltage Vout2 is equal to zero, and the offset voltage of the first differential voltage Vout1 is a certain voltage that is not equal to zero.

External resistors Rg1 and Rg2 are provided to the bridge circuit to adjust the offset voltage of the first differential voltage Vout1. This causes a variation of the electric potential of the output terminal B with reference to the output terminal C-because an electrical current between the terminals A and D varies. As a result, the offset voltage of the first differential voltage Vout1 is adjusted to be equal to zero.

However, an electrical potential of the terminal B1 also varies with reference to the electrical potential of the terminal C1 due to the variation of the electrical current between the terminals A and D by the connection of the external resistors Rg1 and Rg2. As a result, the offset voltage of the second differential voltage Vout2 for the diagnostic output turns not equal to zero.

Similarly, the two offset voltages Vout1 and Vout2 are not adjusted simultaneously even if external resistors Rv1 and Rv2 are provided to a high voltage potential side of the bridge circuit. That is, either the offset voltage Vout1 or Vout2 in the bridge circuit is adjusted with the external resistors, but the two offset voltages Vout1 and Vout2 are not adjusted to be equal to zero simultaneously.

SUMMARY OF THE INVENTION

The present invention therefore has an object to provide a semiconductor dynamic quantity sensor that detects a dynamic quantity and a fault diagnosis through the use of a single bridge circuit, more particularly to adjust an offset voltage of a sensor output and a fault diagnostic output as appropriate.

According to one aspect of the present invention, a semiconductor dynamic quantity sensor has a semiconductor substrate, a bridge circuit, a couple of first output terminals used as a sensor output, and a couple of second output terminals used as a fault diagnostic output. The bridge circuit has four gauge resistors formed on the substrate, and each of the four gauge resistors has a plurality of divisional gauge resistors. The first output terminals are connected to midpoints between the gauge resistors. The second output terminals are connected to wiring patterns between the divisional gauge resistors. At least one of the first output terminals has plurality terminals connected to different positions of the midpoint. At least one of the second output terminals has plurality terminals connected to different positions of the wiring pattern. Accordingly, offset voltages of the sensor output and the fault diagnostic output can be adjusted appropriately when at least one of the plurality terminals are selected as appropriate.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Figure 1:
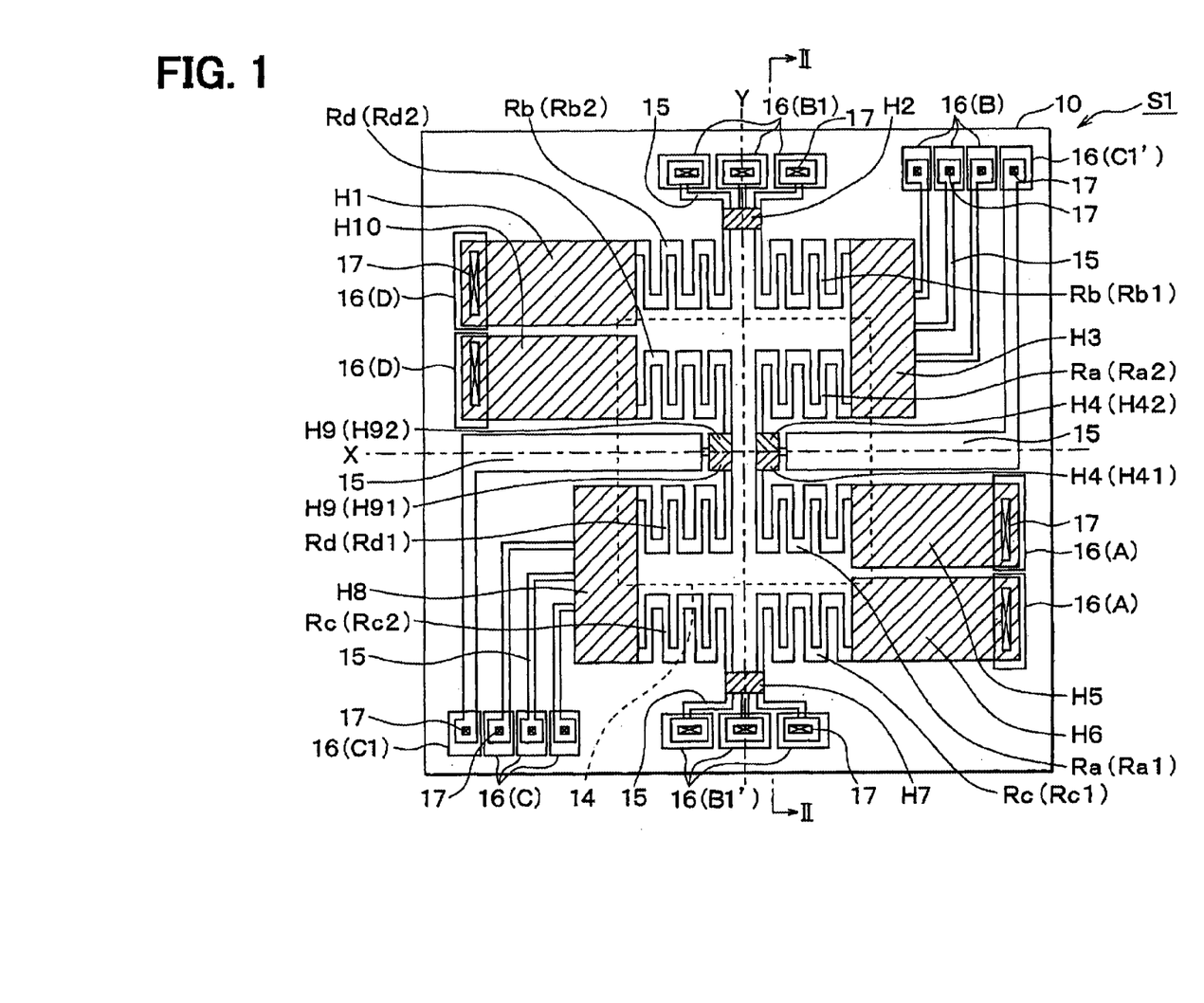
FIG. 1 is a plan view of the semiconductor pressure sensor according to an embodiment of the present invention.
Figure 2:
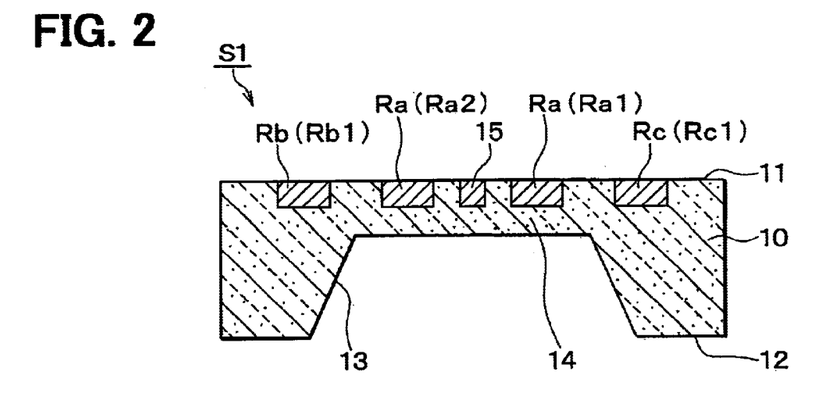
FIG. 2 is a sectional side view taken on line II—II in FIG. 1.

The preferred embodiments of the present invention will be explained with reference to the accompanying drawings. Referring to FIG. 1 and FIG. 2, the sensor S1 includes a semiconductor substrate 10 made from a semiconductor material such as silicon. The sensor S1 is manufactured by well-known semiconductor production techniques. A top surface 11 of the semiconductor substrate is a <110> plane of a silicon single crystal substrate. The <110> plane is shown in FIG. 1. An axis X (first axis) shown by a dashed line is a <001> crystal axis. An axis Y (second axis) also shown by a dashed line is a <110> crystal axis.

Referring to FIG. 2, the substrate 10 has a concavity 13, which is formed by etching a bottom surface 12 of the substrate 10, to provide a diaphragm 14. A broken line in FIG. 1 also shows the diaphragm 14. The diaphragm 14 changes its shape in accordance with an application of a pressure from the top surface side or the bottom surface side. The diaphragm 14 has a square shape, and its thickness is even within a tolerance by manufacturing.

Referring to FIG. 1, four gauge resistors Ra, Rb, Rc, and Rd, which work as strain gauges, are formed on the top surface 11 by an ion-implantation or a diffusion. Resistances of the gauge resistors Ra, Rb, Rc, and Rd vary as the shape of the diaphragm 14 changes.

The four gauge resistors Ra to Rd form a bridge circuit 20 (shown in FIG. 8) in the substrate 10 in the direction of the <110> crystal axis (axis Y) that has good sensitivity. The gauge resistors Ra and Rd are arranged close to a center of the diaphragm 14, and referred to as central gauge resistors. The gauge resistors Rb and Rc are arranged close to a peripheral portion of the diaphragm 14 in comparison with the central gauge resistors Ra and Rd, and referred to as peripheral gauge resistors.

That is, the central gauge resistors Ra and Rd are arranged close to the center of the diaphragm 14 in comparison with the peripheral portion of the diaphragm 14. The peripheral gauge resistors Rb and Rc are arranged close to the peripheral portion of the diaphragm 14 and apart from the center of the diaphragm 14 in comparison with the central gauge resistors Ra and Rd. The peripheral gauge resistors Rb and Rc are located outside a peripheral edge of the diaphragm 14. Opposite stresses, which are tensile stress and compressive stress, are applied to the central gauge resistors Ra and Rd and the peripheral gauge resistors Rb and Rc when a pressure applies to the diaphragm 14. Thus, the resistances of the central gauge resistors Ra and Rd and the peripheral gauge resistors Rb and Rc vary in opposite polarity.

Each of the gauge resistors Ra to Rd has a folded bar pattern. Each of them is divided into two parts so that the gauge resistors Ra, Rb, Rc, and Rd have divisional gauge resistors Ra1 and Ra2, Rb1 and Rb2, Rc1 and Rc2, and Rd1 and Rd2, respectively. The divisional gauge resistors Ra1 to Rd2 have the same resistances.

Wiring patterns H1 to H10 are formed on the top surface 11 to construct the bridge circuit 20 by connecting between the divisional gauge resistors Ra1 to Rd2 in series. The wiring pattern H1 to H10, which are formed between the divisional gauge resistors Ra1 to Rd2, are referred to as gauge wiring patterns. The gauge wiring patterns H1 to H10 are hatched in FIG. 1 to distinguish them clearly.

The gauge wiring patterns H1 to H10 are electrically connected to plugs 16, which are made of aluminums, directly or via lead wiring patterns 15. The plugs 16 are either input terminals or output terminals of the bridge circuit 20, and are electrically connected to an external circuit (not shown) via bonding wires.

The divisional gauge resistors Ra1 to Rd2, the gauge wiring patterns H1 to 10, and the lead wiring patterns 15 are formed by the ion-implantation or the diffusion. The gauge wiring patterns H1 to H10 and the lead wiring patterns 15 are electrically connected to the plugs 16 via contact portions (contact holes) 17. The contact portions 17 are formed by a semiconductor process. In FIG. 1, the contact portions 17 are shown by squares with cross marks.

[Detail Structures in Vicinities of the Gauge Wiring Patterns]

Figure 3:
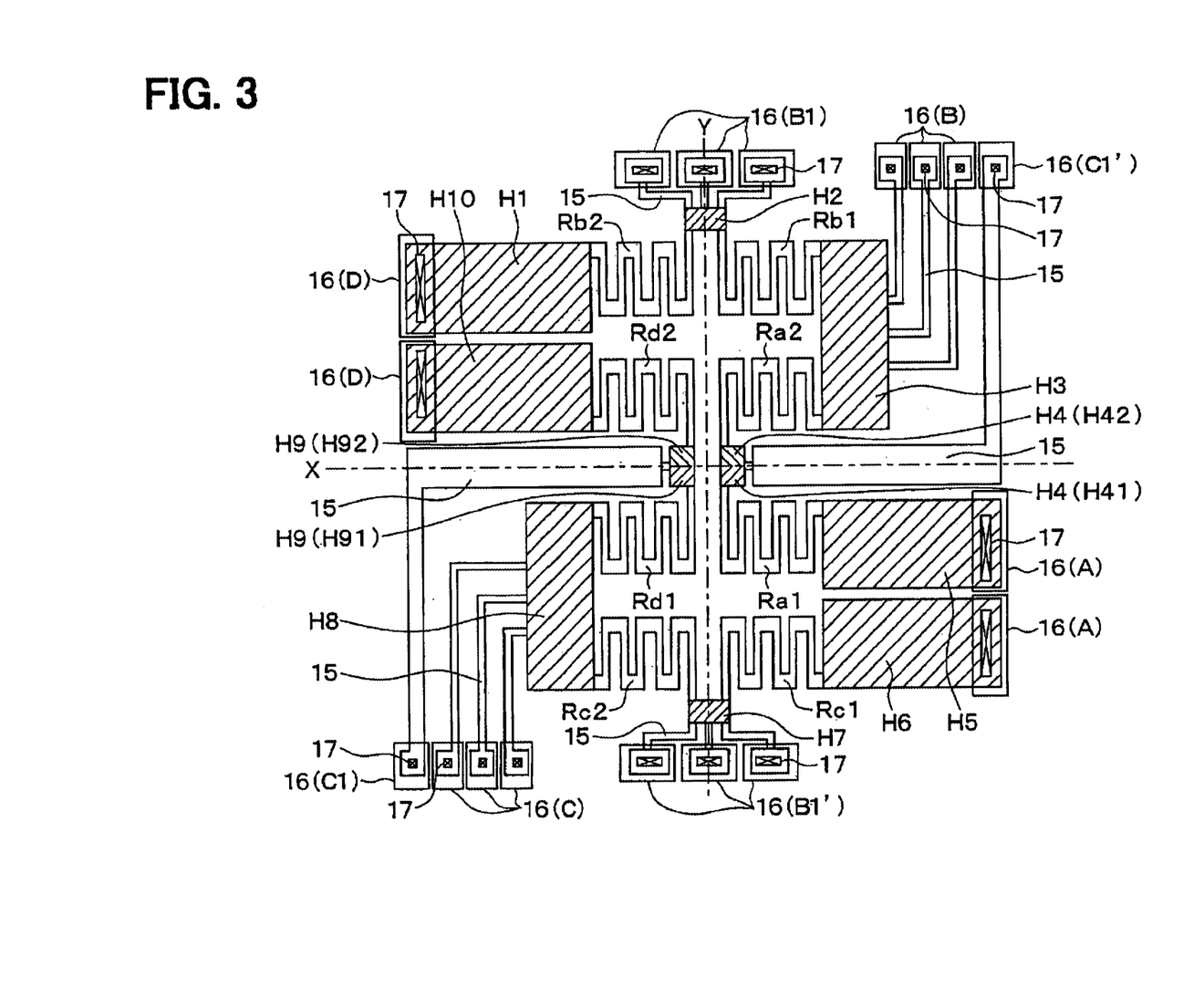
FIG. 3 is a simplified plan view of FIG. 1.

FIG. 3 shows a same view of FIG. 1, but the diaphragm 14 is omitted from FIG. 3 to simplify the drawing. The bridge circuit includes the gauge resistors Ra to Rd and the gauge wiring patterns H1 to H10. The gauge wiring patterns H1 to H10 are constructed of a first group of the gauge wiring patterns H1, H2, H5, H6, H8, and H10 as middle points of the bridge circuit, and a second group of the gauge wiring patterns H2, H4, H7, and H10. The second group of the gauge wiring patterns H2, H4, H7, and H10 is provided between each couple of the divisional gauge resistors Rb1 and Rb2, Ra1 and Ra2, Rc1 and Rc2, and Rd1 and Rd2, respectively.

The gauge wiring patterns H5 and H6 are directly connected to the plugs 16(A), and the gauge wiring patterns H1 and H10 are directly connected to the plugs 16(D). The plugs 16(A) and 16(D) are the input terminals of the bridge circuit 20. The gauge wiring pattern H4 is connected to the plug 16(C1') via the lead wiring pattern 15. The gauge wiring pattern H9 is connected to the plug 16(C1) via the lead wiring pattern 15. The plugs 16(C1') and 16(C1) are the output terminals for a fault diagnosis. The gauge wiring pattern H4 is divided into two divisional gauge wiring patterns H41 and H42 by a boundary that is a central axis (as shown by a dashed line corresponding to the axis X) of the lead wiring pattern 15. The -gauge wiring pattern H9 is also divided into two divisional gauge wiring patterns H91 and H92 by the boundary.

Figure 4:
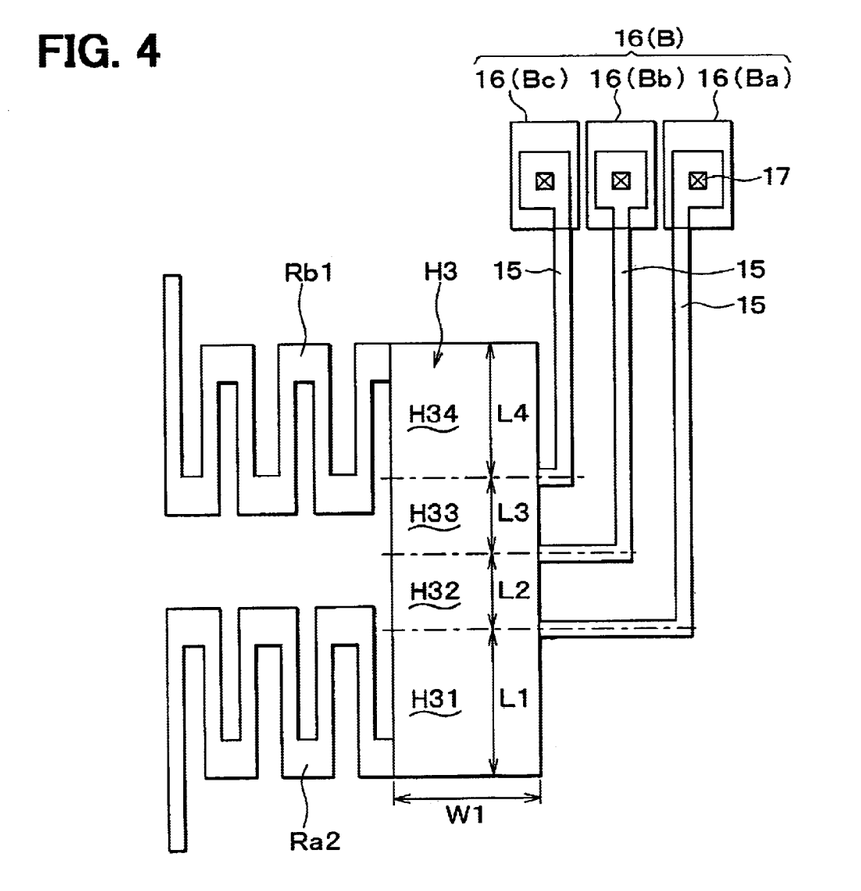
FIG. 4 is an enlarged view of FIG. 1 in a vicinity of a gauge wiring pattern H3.

Referring to FIG. 4, three lead wiring patterns 15 are connected to different positions, resistances of which are different from each other, of the gauge wiring pattern H3. Each of the three lead wiring patterns 15 is connected to each one of plugs 16(Ba), 16(Bb), and 16(Bc). The plugs 16(Ba), 16(Bb), and 16(Bc) are included in the plug 16(B) that is used as one of the output terminals of the sensor S1, and are also shown as the plug 16(B) in FIG. 3.

The gauge resistor H3 is divided into four resistant areas H31, H32, H33, and H34 with respect to the three plugs 16(B). Dashed lines that correspond to central axes of the lead wiring patterns 15 show boundaries of the four resistant areas H31, 32, H33, and H34 in FIG. 4.

Figure 5:
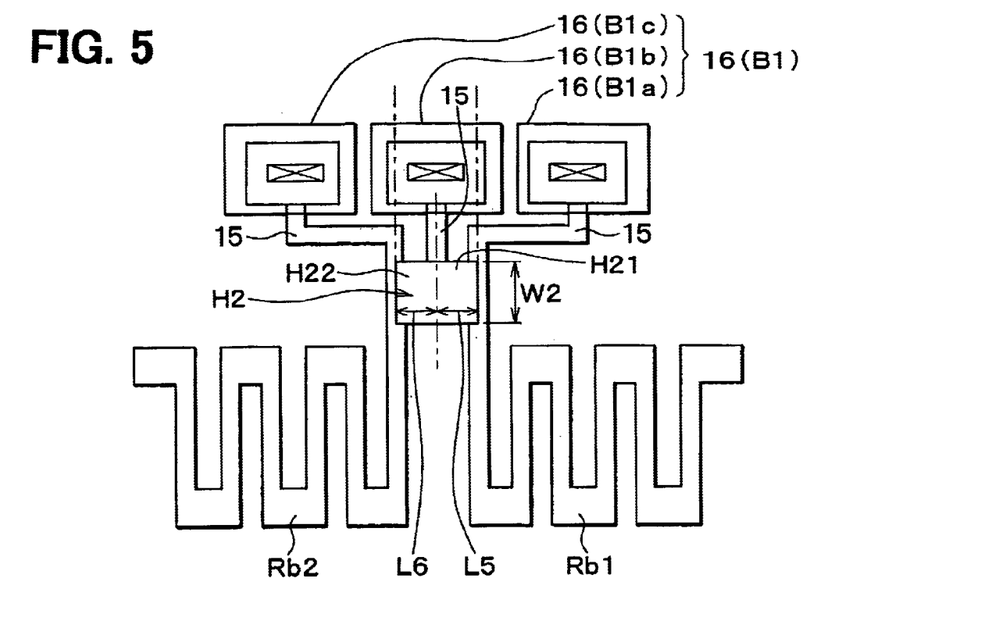
FIG. 5 is an enlarged view of FIG. 1 in a vicinity of a gauge wiring pattern H2.

Referring to FIG. 5, three lead wiring patterns 15 are connected to different positions, resistances of which are different from each other, of the gauge wiring pattern H2. Each of the three lead wiring patterns 15 is connected to each one of plugs 16(B1a), 16(B1b), and 16(B1c). The plugs 16(B1a), 16(B1b), and 16(B1c) are included in the plug 16(B1) that is used as one of the output terminals of the diagnosis, and are also shown as the plug 16(B1) in FIG. 3.

The gauge resistor H2 is divided into two resistant areas H21 and H22 with respect to the three plugs 16(B1). Dashed lines that correspond to central axes of the lead wiring patterns 15 show boundaries of the two resistant areas H21 and H22 in FIG. 5.

Figure 6:
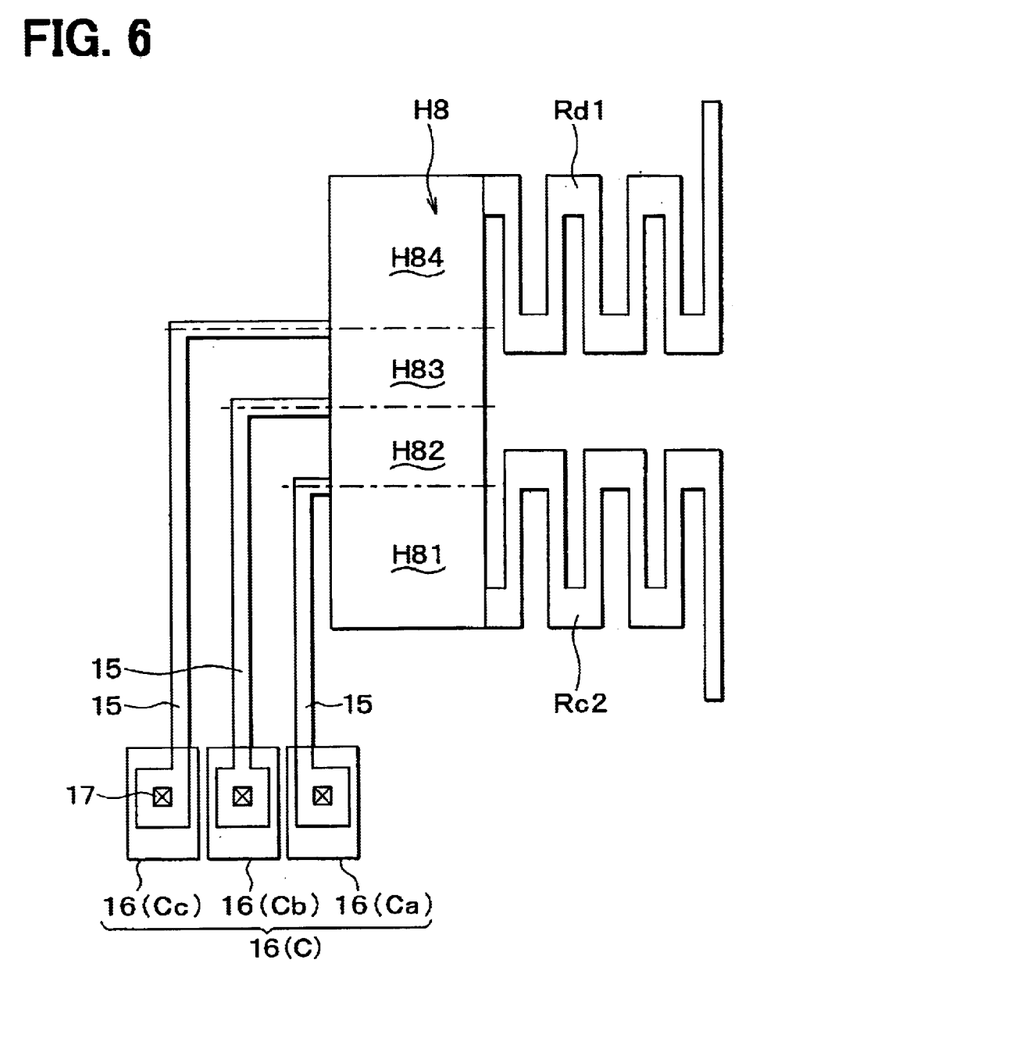
FIG. 6 is an enlarged view of FIG. 1 in a vicinity of a gauge wiring pattern H8.

Referring to FIG. 6, three lead wiring patterns 15 are connected to different positions, resistances of which are different from each other, of the gauge wiring pattern H8. Each of the three lead wiring patterns 15 is connected to each one of plugs 16(Ca), 16(Cb), and 16(Cc). The plugs 16(Ca), 16(Cb), and 16(Cc) are included in the plug 16(C) that is used as one of the output terminals of the sensor, and are also shown as the plug 16(C) in FIG. 3.

The gauge resistor H8 is divided into four resistant areas H81, H82, H83, and H84 with respect to the three plugs 16(C). Dashed lines that correspond to central axes of the lead wiring patterns 15 show boundaries of the four resistant areas H81, H82, H83, and H84 in FIG. 6.

Figure 7:
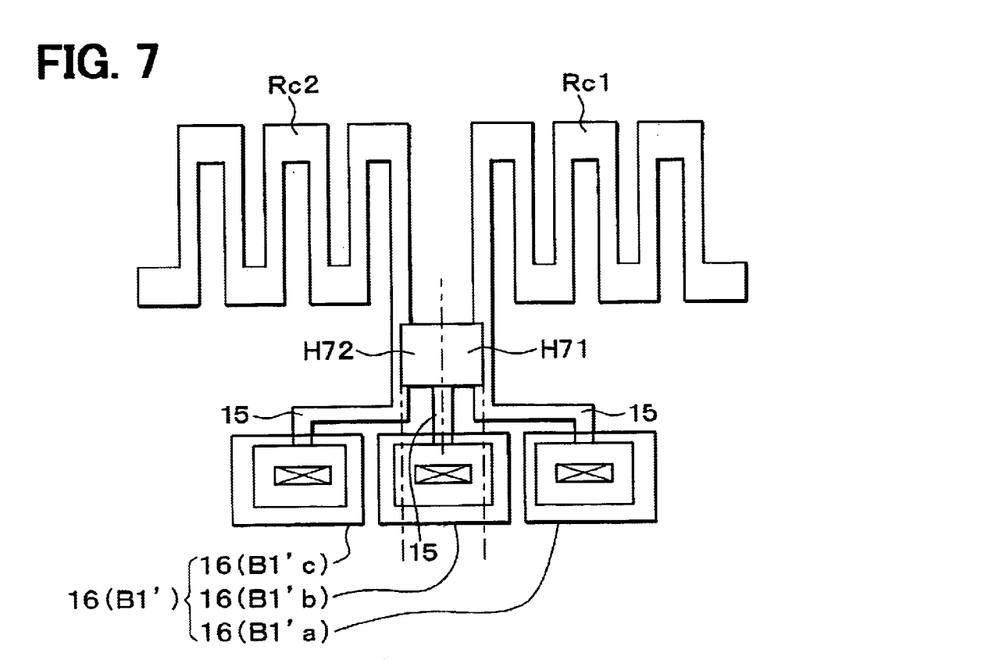
FIG. 7 is an enlarged view of FIG. 1 in a vicinity of a gauge wiring pattern H7.

Referring to FIG. 7, three lead wiring patterns 15 are connected to different positions, resistances of which are different from each other, of the gauge wiring pattern H7. Each of the three lead wiring patterns 15 is connected to each one of plugs 16(B1'a), 16(B1'b), and 16(B1'c). The plugs 16(B1'a), 16(B1'b), and 16(B1'c) are included in the plug 166(B1') that is used as one of the output terminals of the diagnosis, and are also shown as the plug 16(B1') in FIG. 3.

The gauge resistor H7 is divided into two resistant areas H71 and H72 with respect to the three plugs 16(B1'). Dashed lines that correspond to central axes of the lead wiring patterns 15 show boundaries of the two resistant areas H71 and H72 in FIG. 7.

[A Detail Structure of the Bridge Circuit]

Figure 8:
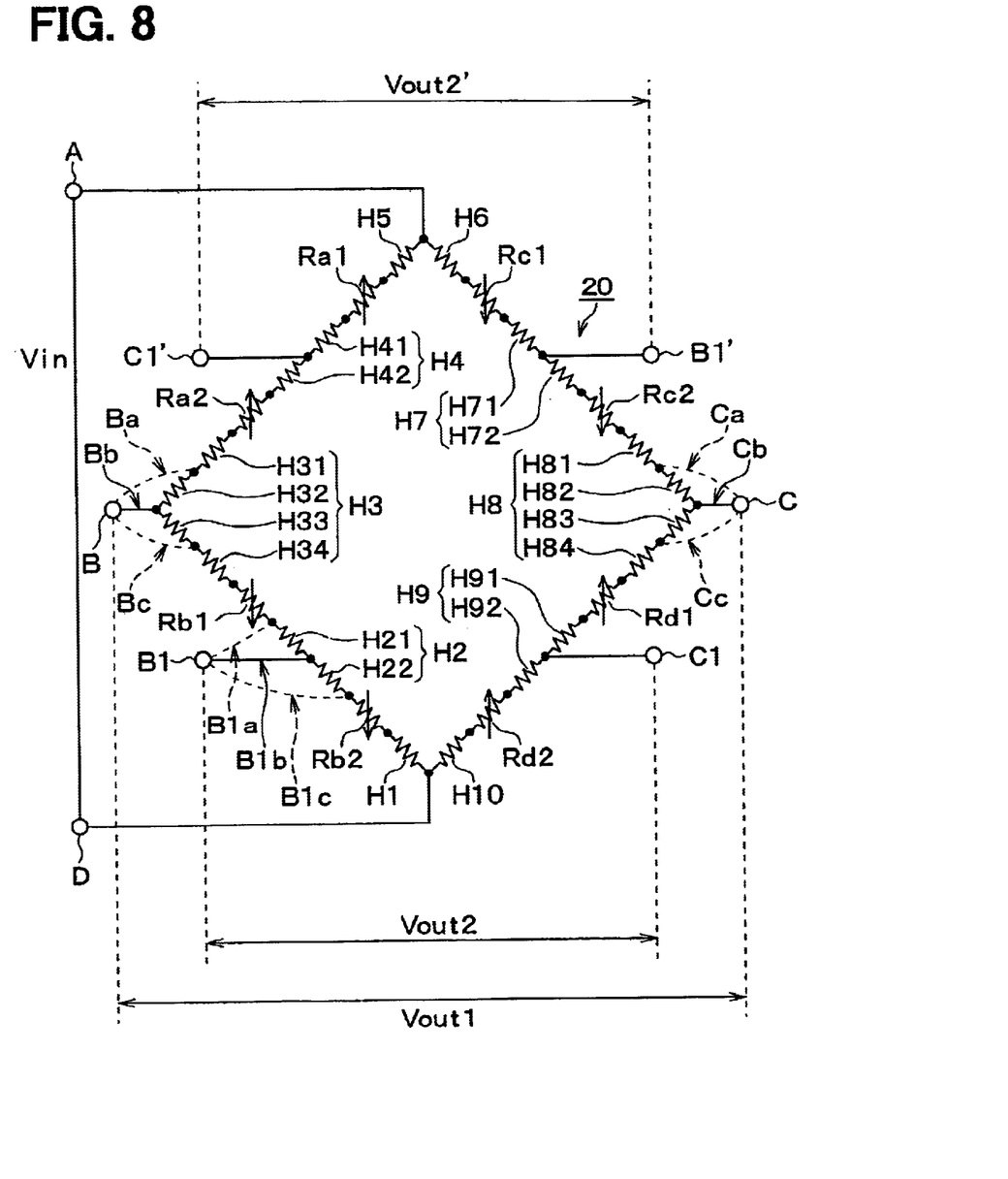
FIG. 8 is an equivalent circuit diagram of the sensor.

FIG. 8 shows an equivalent circuit of the bridge circuit 20. The equivalent circuit includes the four gauge resistors Ra to Rd (the eight divisional gauge resistors Ra1 to Rd2), and resistors of the gauge wiring patterns H1 to H10. The bridge circuit 20 includes four gauge resistors Ra (Ra1 and Ra2), Rb (Rb1 and Rb2), Rc (Rc1 and Rc2), and Rd (Rd1 and Rd2). In the bridge circuit 20, the gauge resistors Ra to Rd are connected to each other in series so that a quadrangular closed circuit constructs a Wheatstone bridge. The plugs 16, which correspond to each one of the terminals A, B, C, D, B1, and C1 in FIG. 8, are shown with parentheses such as 16(A) and 16(B) in FIG. 3 to FIG. 7.

Referring to FIG. 3, each of the input plugs 16(A) and 16(D) has two terminals. Each two terminals of the plugs 16(A) and 16(B) are electrically connected to each other, and connected to the external circuit. Each of the output terminals 16(B), 16(B1), and 16(B1') has three terminals. One of the output terminals 16(B), 16(B1), and 16(B1') is electrically connected to the external circuit.

Referring to FIG. 8, terminals A, B, C, and D are connected to the gauge wiring patterns H1, H3, H5, H6, H8, and H10 that constitute the midpoints of the bridge circuit 20. The terminals A and D, which are opposed to each other, are used for inputting an input voltage (input signal) Vin. The terminals B and C, which are opposed to each other, are used for outputting a first differential voltage (output signal) Vout1. The input terminal A is connected to a power supply (first potential), and the input terminal D is connected to the ground (second potential).

In the bridge circuit 20, each of the gauge resistors Ra to Rd is equally divided into two divisional gauge resistors as described above. For instance, the gauge resistor Ra, which is provided between the input terminal A and the output terminal B, is divided into the two divisional gauge resistors Ra1 and Ra2. Other gauge resistors Rb to Rd are divided into divisional gauge resistors Rb1 and Rb2, Rc1 and Rc2, and Rd1 and Rd2, respectively in the same manner as the gauge resistor Ra.

Further, as described above, the resistances of the divisional gauge resistors Ra1, Ra2, Rd1, and Rd2 with respect to the central gauge resistors and the divisional gauge resistors Rb1, Rb2, Rc1, and Rc2 with respect to the peripheral gauge resistors vary in opposite polarity.

The gauge resistor Ra has a first midpoint between the divisional gauge resistors Ra1 and Ra2, and the first midpoint is connected to a middle terminal C1'. The gauge resistor Rb has a second midpoint between the divisional gauge resistors Rb1 and Rb2, and the second midpoint is connected to a middle terminal B1. The gauge resistor Rc has a third midpoint between the divisional gauge resistors Rc1 and Rc2, and the third midpoint is connected to a middle terminal B1'. The gauge resistor Rd has a fourth midpoint between the divisional gauge resistors Rd1 and Rd2, and the fourth midpoint is connected to a middle terminal C1.

The middle terminals B1 and C1 make a combination of the midpoints at which an equal electric potential is measured when no pressure is applied to the bridge circuit. The combination of the middle terminals B1 and C1 is used as the output terminals for the diagnosis. A second differential voltage Vout2 between the middle terminals B1 and C1 is used as the diagnostic output to detect a fault of the sensor. In detail, the second differential voltage Vout2 is amplified with an amplifier in the external circuit, and an output potential of the amplifier is used for the diagnosis.

[Features of the Preferred Embodiment]

The terminal B (i.e. plug 16(B)) is electrically connected to the gauge wiring pattern H3 that is the midpoint of the bridge circuit 20. The terminal C (i.e. plug 16(C)) is also electrically connected to the gauge wiring pattern H8 that is the midpoint of the bridge circuit 20. The middle terminals B and C are used as sensor output terminals, and the first differential voltage Vout1 is used as the sensor output to detect the intensity of the pressure. Each of the four gauge resistors Ra, Rb, Rc, and Rd is divided into the two divisional gauge resistors Ra1 and Ra2, Rb1 and Rb2, Rc1 and Rc2, and Rd1 and Rd2, respectively.

Each of the terminal B1 (i.e. plug 16(B1)) and C1 (i.e. plug 16(C1)) is electrically connected to the gauge wiring pattern H2 and H9, respectively, that are the midpoint of the bridge circuit 20 and selected from among the gauge wiring patterns H2, H4, H7, and H9. The middle terminals B1 and C1 make a combination of the midpoints at which an equal electric potential is measured when no pressure is applied to the bridge circuit. The combination of the middle terminals B1 and C1 is used as the output terminals for the diagnosis. A second potential difference Vout2 between the middle terminals B1 and C1 is used as the diagnostic output to detect a fault of the sensor.

The output terminal B for the sensor output has three different terminals Ba, Bb, and Bc that are connected to three different positions, resistances of which are different from each other, of the gauge wiring pattern H3. The output terminal C for the sensor output has three different terminals Ca, Cb, and Cc that are connected to three different positions, resistances of which are different from each other, of the gauge wiring pattern H8.

The middle terminal B1, which is one of the output terminals for the diagnosis, has three different terminals B1a, B1b, and B1c. The different terminals B1a, B1b, and B1c are connected to three different positions, resistances of which are different from each other, of the gauge wiring pattern H2.

[Detective Operation]

Referring to FIG. 8, the semiconductor dynamic quantity sensor S1 has one input Vin and two outputs Vout1 and Vout2. The sensor S1 has the output terminals B and C for the sensor output, and the output terminals B1 and C1 for the fault diagnosis output.

When the diaphragm 14 changes its shape in accordance with the application of the pressure in condition that the input signal Vin is inputted into the bridge circuit 20, the four gauge resistors Ra to Rd lose a balance in electrically. The first differential voltage (output signal) Vout1 varies in response to the amount of the applied pressure. The first differential voltage Vout1 is supplied to the external circuit to detect the intensity of the pressure.

The fault is detected by that the first differential voltage Vout1 is compared with the second differential voltage Vout2. Since each divisional gauge resistors Ra1 to Rd2 has the same resistance, a first ratio between the divisional gauge resistors Rd1 and Rd2 is 1:1, and a second ratio between the divisional gauge resistors Rb1 and Rb2 is 1:1. As a result, in a normal condition, the second differential voltage Vout2 for the diagnosis is always a half voltage of the first differential voltage Vout1.

However, in an unusual condition that an irregular stress is applied to the diaphragm 14 or the divisional gauge resistors Ra1 to Rd2 are broken, the first ratio and the second ratio are deviated from 1:1. As a result, in the unusual condition, the second differential voltage Vout2 for the diagnosis is not a half voltage of the first differential voltage Vout1. That is, a relation between the differential voltages Vout1 and Vout2 in the unusual condition is different from the relation in the normal condition. This provides the judgment of the fault in the sensor S1.

If the diagnostic output Vout2 is not provided in the sensor S1 and the sensor S1 produces only the sensor output Vout1, a reason of the variation cannot be judged when the sensor output Vout1 varies to a certain voltage, such as zero. The reason includes at least one of whether the diaphragm 14 is damaged, the gauge resistors Ra to Rd are broken, the external circuit has a fault, or the pressure is actually zero.

However, since the diagnostic output vout2 is provided in the sensor S1, the sensor S1 does not have such a problem. For instance, when the sensor output Vout1 varies to zero and diagnostic output Vout2 is equal to zero, the reason is correctly judged that the fault is not occurred and the pressure is actually equal to zero.

According to the present invention, each of the four gauge resistors Ra to Rd that forms the bridge circuit 20 is divided into the two divisional gauge resistors Ra1 to Rd2. The middle terminals B1 and C1 are connected to the midpoint between the couple of divisional gauge resistors to make a combination of the midpoints at which equal electric potential is measured when no pressure is applied to the bridge circuit 20. The second differential voltage Vout2 between the middle terminals B1 and C1 is used for the diagnosis. Accordingly, the sensor S1 can detect the intensity of the pressure and the fault of the sensor S1 by the single bridge circuit.

[Adjustment of the Offset Voltage]

Offset voltages exist in both the first differential voltage Vout1 for the sensor output and the second differential voltage Vout2 for the diagnostic output in the bridge circuit 20 in reality. The offset voltages, which are generated by the sensor and diagnostic outputs when the pressure is not applied to the diaphragm 14, are cause of errors to detect the pressure and the fault. If resistances of the gauge wiring patterns H1 to H10 that connect between the divisional gauge resistors Ra1 to Rd2 in the bridge circuit 20 are zero or the identical in an ideal condition, the offset voltages are not produced. However, the offset voltages are produced in reality.

Under the condition in reality, each of the output terminals B and C for the sensor output has plurality (three) selectable output terminals Ba, Bb, and Bc, and Ca, Cb, and Cc. The output terminal B1 for the diagnostic output, which is one of the output terminals B1 and C1 for the diagnostic output, has plurality (three) selectable output terminals B1a, B1b, and B1c. That is, the output terminal B, C, and B1 are selectable. Accordingly, combinations of the selectable output terminals for the sensor output and the diagnostic output can be selected in accordance with the condition.

When the combination is appropriately selected from among the plurality selectable output terminals, the offset voltages are adjusted as appropriate to bring the offset voltages close to zero in condition that the sensor output and the diagnostic output do not influence each other. For example, suppose that the offset voltage of the second differential voltage Vout2 is equal to zero, and the offset voltage of the first differential voltage Vout1 is a certain voltage that is not equal to zero. In addition, suppose that the selectable output terminals Bb and Cb for the sensor output are selected.

The connection of the output terminal C is changed from the selectable output terminal Bb to other terminal Ba or Bc so that the offset voltage of the sensor output can be adjusted as appropriate in a certain condition. The certain condition is that the selectable output terminal Cb is still selected from among the output terminal C.

In detail, referring to FIG. 4, the connection of the plug 16(B) is changed from the plug 16(Bb) to the plug 16(Ba) or the plug 16(Bc). Lengths L1, L2, L3, and L4 of the four divisional resistant areas H31 to H34, and a width W1 of that are shown in FIG. 4. A symbol "ρs" is a sheet resistance of that.

When the connection of the output terminal B is changed from the terminal Bb to Ba, a present output voltage from the terminal Ba increases by a certain voltage ρs·(L2/W1) in comparison with a previous output voltage from the terminal Bb. When the connection of the output terminal B is changed from the terminal Bb to Bc, a present output voltage from the terminal Bc decreases by a certain voltage ρs·(L3/W1) in comparison with the previous output voltage from the terminal Bb. That is, when the connection of the output terminal B is changed from the terminal Bb to Ba or Bc to adjust the offset voltage of the sensor output, the offset voltage is varied with ρs·(L2/W1), or ρs·(L3/W1).

The resistance between the input terminals A and D is not changed even when the connection of the output terminal B is changed. Thus, an electrical current between the input terminals A and D are not changed. As a result, the selection of the output terminal B does not influence an electrical potential of the diagnostic output terminal (middle terminal) B1, and the electrical potential of the output terminal B1 does not vary.

This is the same when the connection of the output terminal C is changed. As a result, the offset voltage of the sensor output becomes close to zero when the combination of the output terminals B and C for the sensor output is selected appropriately.

This is the same in an adjustment of the offset voltage of the diagnostic output. For example, suppose that the offset voltage of the first differential voltage Vout1 is equal to zero, and the offset voltage of the second differential voltage Vout2 is a certain voltage that is not equal to zero. In addition, suppose that the output terminals B1b and C1 for the diagnostic output are selected. The connection of the terminal B1 is changed from the selectable output terminal B1b to other terminal B1a or B1c so that the offset voltage of the diagnostic output can be adjusted as appropriate.

In detail, referring to FIG. 5, the connection of the plug 16(B1) is changed from the plug 16(B1b) to the plug 16(B1a) or the plug 16(B1c). Lengths L5 and L6 of the two divisional resistant areas H21 and H22, and a width W2 of that are shown in FIG. 5. A symbol "ρs" is a sheet resistance of that.

When the connection of the output terminal B1 is changed from the terminal B1b to B1a, a present output voltage from the terminal B1a increases by a certain voltage ρs·(L5/W2) in comparison with a previous output voltage from the terminal B1b. When the connection of the output terminal B1 is changed from the terminal B1b to B1c, a present output voltage from the terminal B1c decreases by a certain voltage ρs·(L6/W2) in comparison with the previous output voltage from the terminal B1b. That is, when the connection of the output terminal B1 is changed from the terminal B1b to B1a or B1c to adjust the offset voltage of the diagnostic output, the offset voltage is varied with ρs·(L5/W2), or ρs·(L6/W2).

The resistance between the input terminals A and D is not changed even when the connection of the output terminal B1 is changed. Thus, the electrical current between the input terminals A and D are not changed. As a result, the selection of the output terminal B1 does not influence the electrical potential of the sensor output terminal B, and the electrical potential of the output terminal B does not vary. Therefore, the offset voltage of the diagnostic output becomes close to zero when the combination of the output terminal B1 and C1 for the diagnostic output is selected appropriately.

For selecting the output terminal appropriately to adjust the offset voltage, an inspection of the bridge circuit 20 is performed in advance of a connection between the terminals and the external circuit. Then, the appropriate output terminals are connected to the external circuit by a wire bonding.

The present invention should not be limited to the embodiments previously discussed and shown in the figures, but may be implemented in various ways without departing from the spirit of the invention. For example, in the foregoing embodiment, each of the output terminals B, C, and C1 for the sensor output and the diagnostic output has three selectable output terminals. However, each of the output terminals B, C, and C1 may have two or not less than four selectable output terminals. When the output terminals have not less than three selectable output terminals, variations of the offset voltages are easily determined as to whether the variations are linear or nonlinear. This causes easiness to pick out a zero point of the offset voltage.

A differential voltage between any two middle terminals can be used as the diagnostic output if the electric potentials of the middle terminals are the same in a condition that the pressure is not applied. For example, referring to FIG. 8, the sensor S1 has middle terminals B1' and C1'. The middle terminal B1' is connected to the midpoint between the divisional gauge resistors Rc1 and Rc2. The middle terminal C1' is connected to the midpoint between the divisional gauge resistors Ra1 and Ra2. The middle terminals B1' and C1' can be used as the diagnostic output in the sensor S1.

A third differential voltage Vout2' between the middle terminals B1' and C1' is used as the second diagnostic output. If the middle terminal B1' has three selectable output terminals B1a', B1b', and B1c', the offset voltage of the diagnostic output is adjusted in the same manner as the middle terminal B1.

The offset voltage may be adjusted so that the offset voltage is close to a certain voltage according to a requirement of the circuit. The certain voltage is not a zero but a high voltage.

In the foregoing embodiment, only one middle terminal B1 in the output terminals B1 and C1 for the diagnosis is constructed of plurality selectable output terminals B1a, B1b, and B1c. Similarly, only one middle terminal B1' in the output terminals B1' and C1' for the diagnosis is constructed of plurality selectable output terminals. However, each of the other middle terminals C1 and C1' may have plurality selectable output terminals.

In the foregoing embodiment, each of the four gauge resistors Ra to Rd is divided into the two divisional gauge resistors. However, each of the gauge resistors Ra to Rd may be divided into three or more divisional gauge resistors. When the gauge resistors Ra to Rd are divided into three or more divisional gauge resistors, an equal combination is used as the output terminals for the diagnosis, and a differential voltage between the output terminals is used as the diagnostic output. The equal combination is a combination of midpoints, which are connections among the three or more divisional gauge resistors, at which equal electric potential is measured.

The sensor S1 is applicable to a semiconductor pressure sensor. The semiconductor pressure sensor includes a metal sleeve that has a thin closed end portion and an open-end portion. The thin closed end portion is formed at one side of the metal sleeve, and it has a thin portion on which the semiconductor substrate is arranged. The open-end portion is formed at the other side of the metal sleeve, and it introduces a pressure to the thin closed end portion. The thin closed end portion changes its shape by applying the pressure, and then the semiconductor itself also changes its shape as the diaphragm by the change of the thin closed end portion.

Moreover, the sensor S1 is applicable to an acceleration sensor that has a diaphragm, which changes its shape by applying a shock when acceleration is applied to the sensor Si. The acceleration sensor detects a stress in the diaphragm with gauge resistors.

What is claimed is:

1. A semiconductor dynamic quantity sensor comprising:
a semiconductor substrate that has a diaphragm changing a shape thereof in accordance with an application of a dynamic quantity;
a bridge circuit that has four gauge resistors formed on the semiconductor substrate, resistances of the four gauge resistors varying based on a stress with respect to changing the shape of the diaphragm, each of the four gauge resistors having a plurality of divisional gauge resistors;
a pair of first output terminals connected to a pair of respective first midpoints between the four gauge resistors, a differential electric potential between the first output terminals being used as a sensor output; and
a pair of second output terminals connected to a pair of respective second midpoints between the divisional gauge resistors, a differential electric potential between the second output terminals being used as a diagnostic output,
wherein at least one of the first output terminals has a plurality of terminals connected to different positions of the respective first midpoints, and
at least one of the second output terminals has a plurality of terminals connected to different positions of respective wiring patterns formed between the divisional gauge resistors.

2. The semiconductor dynamic quantity sensor according to claim 1, wherein one of the first output terminals has not less than three terminals, and one of the second output terminals has not less than three terminals.

3. The semiconductor dynamic quantity sensor according to claim 1, wherein the second output terminals make a combination of the second midpoints at which an equal electric potential is measured when no pressure is applied to the semiconductor substrate.

4. A semiconductor dynamic quantity sensor comprising:
a semiconductor substrate that has a diaphragm changing a shape thereof in accordance with an application of a dynamic quantity;
a bridge circuit that has four gauge resistors formed on the semiconductor substrate, resistances of the four gauge resistors varying based on a stress with respect to changing the shape of the diaphragm, each of the four gauge resistors having a plurality of divisional gauge resistors;
a pair of first output terminals connected to a pair of respective first midpoints between the four gauge resistors, a differential electric potential between the first output terminals being used as a sensor output; and
a pair of second output terminals connected to a pair of respective second midpoints between the divisional gauge resistors, a differential electric potential between the second output terminals being used as a diagnostic output,
wherein at least one of the first output terminals and the second output terminals has a plurality of terminals connected to different positions of the respective first midpoints.

5. The semiconductor dynamic quantity sensor according to claim 1, wherein two of the four gauge resistors are arranged close to a center of the diaphragm, and the other two of the four gauge resistors are arranged outside a peripheral edge of the diaphragm.

6. The semiconductor dynamic quantity sensor according to claim 1, wherein each of the divisional gauge resistors has a same resistance.

7. The semiconductor dynamic quantity sensor according to claim 4, wherein the at least one of the first output terminals and second output terminals has not less than three terminals.

8. The semiconductor dynamic quantity sensor according to claim 4, wherein the second output terminals make a combination of the second midpoints at which an equal electric potential is measured when no pressure is applied to the semiconductor substrate.

9. The semiconductor dynamic quantity sensor according to claim 4, wherein two of the four gauge resistors are arranged close to a center of the diaphragm, and the other two of the four gauge resistors are arranged outside a peripheral edge of the diaphragm.

10. The semiconductor dynamic quantity sensor according to claim 4, wherein each of the divisional gauge resistors has a same resistance.

* * * * *